R. P. VIAR.
JOINTER CLAMP.
APPLICATION FILED JAN. 26, 1921.
1,410,084.
Patented Mar. 21, 1922.
2 SHEETS—SHEET 1.
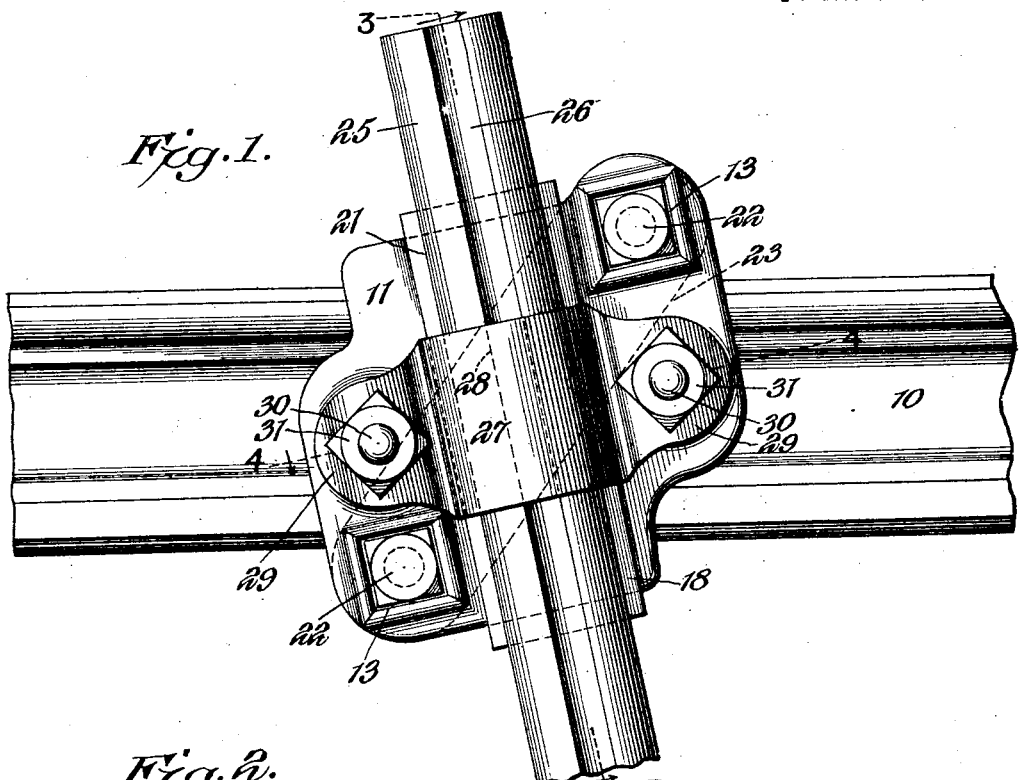
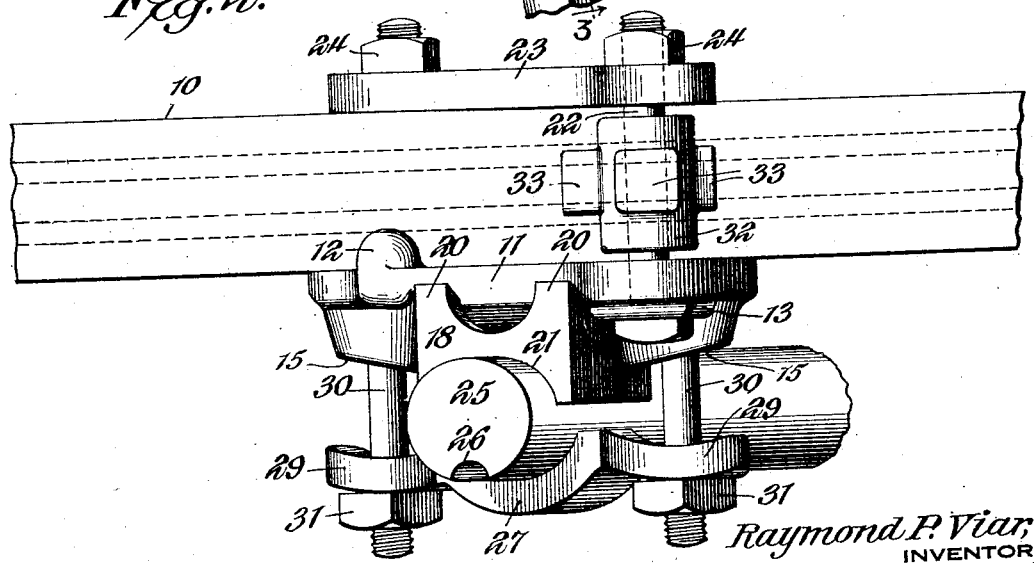
Raymond P. Viar,
INVENTOR,

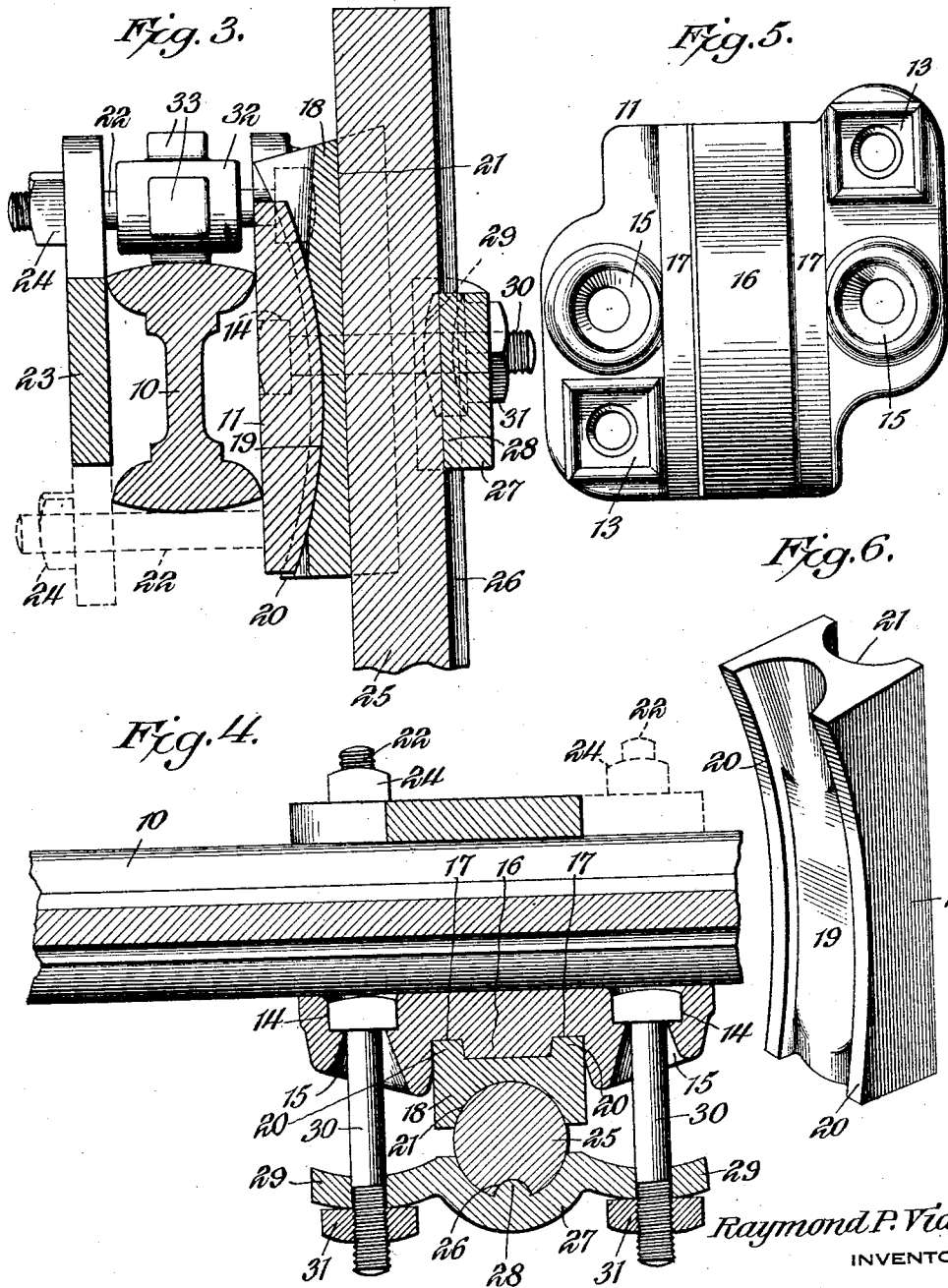

UNITED STATES PATENT OFFICE.

RAYMOND PRESCOTT VIAR, OF LYNCHBURG, VIRGINIA.

JOINTER CLAMP.

1,410,084.  Specification of Letters Patent.  Patented Mar. 21, 1922.

Application filed January 26, 1921. Serial No. 439,972.

*To all whom it may concern:*

Be it known that I, RAYMOND P. VIAR, a citizen of the United States, residing at Lynchburg, in the county of Campbell and State of Virginia, have invented a new and useful Jointer Clamp, of which the following is a specification.

This invention relates to jointer or colter clamps.

The object of the invention is to provide an adjustable clamping device for connecting the round shank of a colter or jointer with the beam of a plow whereby easy and rapid adjustment both longitudinally and transversely of the plow beam may be had.

The device of the invention includes means whereby the jointer may be held at any desired point along the plow beam, means whereby the jointer may be adjusted to the plow furrow properly, means for effecting vertical adjustment of the shank, and means whereby a fore-and-aft swinging adjustment of said shank is allowed. The novelty of the invention is believed to reside in the means for adjusting the jointer to plow furrow properly and in the means for adjusting the fore-and-aft position of the jointer shank.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the claims.

In the drawing:

Fig. 1 is a side elevation showing the improved clamp holding the jointer shank to a plow beam.

Fig. 2 is a top plan view of the same.

Fig. 3 is a transverse section substantially on the line 3—3 of Fig. 1.

Fig. 4 is a section on the line 4—4 of Fig. 1.

Fig. 5 is an elevation of the base plate.

Fig. 6 is a perspective view of the adjusting block to adjust jointer to plow furrow properly.

The numeral 10 designates the plow beam, and 11 is the base plate of the improved clamp. This base plate, as seen in Fig. 2, has a projection 12 adapted to fit upon the top flange of the beam 10. The base plate has a pair of square sockets or recesses 13 adapted to receive the heads of bolts 22. A clamping bar 23 is united to the bolts 22 on the opposite side of the plow beam 10 by means of nuts 24. One bolt 22 is on the upper side of the beam and the second bolt passes underneath the beam. Obviously by loosening the nuts 24, the base plate may be loosened and slid along the plow beam to the desired point where it may be clamped by tightening said nuts.

The base plate 11 has a key 16 of uniform width and extending from end to end medially of the plate. The key 16 is curved longitudinally as best seen in Fig. 3 and is somewhat wider at its base where it joins with the plate 11 than at its curved surface. This slight taper in the width will be observed from Fig. 4. The key 16 is of uniform thickness or, in other words, it rises the same distance from the main body of the plate throughout its length and the plate itself is provided with a pair of smooth arcuate track portions 17 for a purpose to be described. The curvature of the track portions 17 is the same as that of the key 16.

An adjusting block 18 is provided with a longitudinally curved surface 19 bordered on two sides by projecting flanges 20. The flanges 20, in conjunction with the surface 19, provide a recess or channel of the proper shape to receive the key 16 with the outer faces or edges of the flanges 20 seating on the track portions 17 of the base plate. The face 19 is curved similarly to the key 16 but is of less arcuate extent. On the other hand, the block 18 has a greater length than the key 16, as seen in Fig. 3. The block 18 has a longitudinally-extending curved seat 21 for the reception of the round shank 25 of a colter or jointer, this seat being opposed to the channel which receives the key 16. The shank 25, as is customary, has a groove 26 extending the length thereof, into which groove a key 28 of a clamping plate 27 is adapted to fit. The clamping plate 27 partly embraces the round shank 25 and is provided with terminal perforated ears 29. Through said perforations bolts 30 are passed, the heads of these bolts being received within seats 14 provided on the base plate 11. Swinging of the bolts 30 is permitted by the provision of flaring bores 15 joining the recesses 14. Nuts 31 engaging with the bolts 30 hold the clamping plate 27, the shank, the block and the base plate firmly together. Loosening of the nuts 31 permits vertical adjustment of the shank and also allows a fore-and-aft swinging adjustment and an adjustment for width, as will now be explained.

The block 18 has a less thickness at its lower end than at the upper end. Hence, when this block is moved longitudinally, it shifts the position of the shank 25 relative to the plow beam. If the block is moved downwardly, since its thick end is uppermost, the upper end of the shank 25 will be swung outwardly, causing inward swinging of the lower end of the shank and hence of the colter or jointer with respect to the plow beam. If, on the other hand, the adjusting block 18 is moved upwardly, positioning of the colter away from the plow beam is effected. Thus the correct width of a cut made by the colter or jointer can be varied to meet conditions.

The upper bolt 22 mounts a barrel 32 whereby the barrel may be turned on the bolt as an axis. A series of lugs 33 is formed integrally with the barrel 32, these lugs extending radially and having substantially flat outer faces adapted to contact with the upper face of the plow beam. The thickness or height of these lugs 33 varies, each lug being of different height. For convenience, the lugs 33 are rectangular and have broad bearing faces so that when the nut 24 of the upper bolt 22 is loosened, the barrel may be revolved to bring any one of the lugs into engagement with the plow beam, whereupon the barrel will maintain itself in that position without any tendency to turn. Obviously, when it is desired to rock the shank forwardly to a greater extent, one of the lugs 33 having the most thickness will be brought into contact with the plow beam, thereby raising the upper bolt 22 above the beam and effecting a fore-and-aft swinging adjustment. In other words, a series of lugs 33 each having varying lengths form in effect a cam for rocking the shank of the colter.

The invention provides a simple, efficient and quick-acting clamping device for the purpose described, one which is easily manufactured, all the parts being readily cast, which is durable, of rugged construction and accurate and permanent in the adjustments yielded.

What is claimed is:—

1. The combination with a base plate and means for clamping the same to a plow beam, of a block mounted to slide longitudinally along said base plate, a key on the base plate and a recess on the block shaped to receive said key whereby the block is guided by the key when slid for adjustment, means for clamping the shank of a colter or jointer to said base plate, said block providing means whereby the cutting position of said jointer may be varied.

2. The combination with a base plate and means for clamping the same to a plow beam, of a block mounted to slide on said base plate, cooperating means on the base plate and block for guiding the block when slid for adjustment, means for clamping the shank of a colter or jointer to said base plate, said block providing means whereby the cutting position of said jointer may be varied, and means adjustable about a horizontal axis for engaging with the plow beam for effecting a fore-and-aft rocking adjustment of the jointer.

3. The combination with a base plate and means for clamping the same to a plow beam, of a block mounted to slide on said base plate, said block having longitudinally extending recesses on opposed faces, one of said recesses being adapted to receive the shank of a colter or jointer, a key provided on the base plate and interlocking with the opposite recess to prevent all but longitudinal movement of the block, the upper end of said block being wider than the lower end, means for clamping the shank of a jointer to said base plate with the block interposed between the two, the varying width of said block permitting the cutting position of the jointer to be varied.

4. The combination with a base plate and means for clamping the same to a plow beam, of a block mounted to slide on said base plate, said block having longitudinally extending recesses on opposed faces, one of said recesses being adapted to receive the shank of a colter or jointer, a key provided on the base plate and interlocking with the opposite recess to prevent all but longitudinal movement of the block, the upper end of said block being wider than the lower end, means for clamping the shank of a jointer to said base plate with the block interposed between the two, the varying width of said block permitting the width of the cut of the jointer to be varied, and rotatable means adjustable about a horizontal axis engaging with the plow beam for effecting a fore-and-aft rocking adjustment of the jointer.

5. The combination with a base plate and means for clamping the same to a plow beam, said means including a bolt passing across said beam on the upper side, of means for clamping the shank of a colter or jointer to said base plate, and means engaging with the plow beam for effecting a fore-and-aft rocking adjustment of the jointer, said latter means comprising a barrel rotatable on said bolt, said barrel having a plurality of lugs outstanding from the peripheral face thereof, said lugs varying in thickness or in the extent of their projection.

6. The combination with a base plate and means for clamping the same to a plow beam, said means including a bolt passing across said beam on the upper side, of means for clamping the shank of a colter or jointer to said base plate, means engaging with the plow beam for effecting a fore-and-aft rocking adjustment of the jointer, said latter means comprising a barrel rotatable on said bolt, said barrel having a plurality of lugs outstanding from the peripheral face thereof, said lugs varying in thickness or in the extent of their projection, and means for varying the cutting position of said jointer, said latter means comprising a block mounted between the base plate and the shank and having a greater width at one end than at the other whereby sliding of the block effects the transverse swinging of the shank.

7. The combination with a base plate and means for clamping the same to a plow beam, of a block having opposed longitudinally extending recesses, said base plate having a key fitting into one of said recesses whereby the block may be slid longitudinally only upon said base plate, means for clamping the shank of a colter or jointer to said base plate and seated in the opposite recess of the block, said block being larger at one end than at the other whereby sliding of the block along the base plate effects rocking of the shank transversely with respect to the plow beam so that the cutting position of the jointer may be varied, and means engaging with the plow beam for effecting a fore-and-aft rocking adjustment of the jointer, said means including a barrel mounted on the base plate clamping means and having means integral therewith for engagement with the top of the plow beam to space said barrel varying distances above the plow beam.

8. The combination with a base plate and means for clamping the same to a plow beam, of a longitudinally curved key provided on said base plate and extending in a nearly up-and-down direction when the base plate is in the usual position upon a plow beam, of a block having a complementary recess fitting said key and having longitudinally curved flanges adapted to slide over the curved surface of the base plate bordering said key, said block being wider at its upper end than at the lower end, a recess extending longitudinally of the block and opposed to the recess in which the key fits, means for clamping the shank of a colter or jointer to said base plate and fitted into the last-named recess of the block, the longitudinal position of the block relative to the base plate effecting variation of the cutting position of said jointer, and cam means carried by the base plate clamping means and engaging with the upper side of the plow beam for effecting a fore-and-aft rocking adjustment of the jointer.

In testimony, that I claim the foregoing as my own, I have hereto affixed my signature.

RAYMOND PRESCOTT VIAR.